(12) United States Patent
Fujii

(10) Patent No.: US 12,353,553 B2
(45) Date of Patent: Jul. 8, 2025

(54) INFORMATION PROCESSING APPARATUS AND CONTROL METHOD OF THE SAME

(71) Applicant: CANON KABUSHIKI KAISHA, Tokyo (JP)

(72) Inventor: Takashi Fujii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 17/885,706

(22) Filed: Aug. 11, 2022

(65) Prior Publication Data

US 2023/0069169 A1    Mar. 2, 2023

(30) Foreign Application Priority Data

Aug. 26, 2021  (JP) ................................ 2021-138253

(51) Int. Cl.
*G06F 21/57*    (2013.01)
*G06F 3/06*    (2006.01)

(52) U.S. Cl.
CPC ............ *G06F 21/57* (2013.01); *G06F 3/0604* (2013.01); *G06F 3/0629* (2013.01); *G06F 3/0644* (2013.01); *G06F 3/0679* (2013.01)

(58) Field of Classification Search
CPC ...... G06F 21/57; G06F 3/0604; G06F 3/0629; G06F 3/0644; G06F 3/0679
See application file for complete search history.

(56) References Cited

U.S. PATENT DOCUMENTS

| 5,214,695 A * | 5/1993 | Arnold .................. G06F 9/4401 713/187 |
| 2003/0177329 A1* | 9/2003 | Larvoire ............... G06F 3/0601 711/173 |
| 2004/0088367 A1* | 5/2004 | Reinke ...................... G06F 8/63 709/215 |
| 2004/0153746 A1* | 8/2004 | Talagala .............. G06F 11/1004 714/6.13 |
| 2004/0153840 A1* | 8/2004 | Buchanan, Jr. ..... G06F 11/1417 714/42 |

(Continued)

FOREIGN PATENT DOCUMENTS

JP    2019153050 A    9/2019

*Primary Examiner* — Jung W Kim
*Assistant Examiner* — Alan L Kong
(74) *Attorney, Agent, or Firm* — ROSSI, KIMMS & McDOWELL LLP

(57) ABSTRACT

The present invention directs to an information processing apparatus comprising a nonvolatile storage unit configured to store at least first management information including information regarding number of sectors in a storage area, second management information including information regarding a partition, and third management information for restoring the second management information. The information processing apparatus comprises verifying validity of the second management information on start-up of the information processing apparatuses, identifying, in a case where an abnormality is detected in the second management information in the verifying, a storage location of the third management information based on the first management information, and restoring the second management information in which the abnormality is detected using the third management information.

7 Claims, 3 Drawing Sheets

(56) References Cited

U.S. PATENT DOCUMENTS

| | | | |
|---|---|---|---|
| 2004/0255106 A1* | 12/2004 | Rothman | G06F 11/1417 713/1 |
| 2008/0005527 A1* | 1/2008 | Bang | G06F 9/441 711/202 |
| 2012/0151223 A1* | 6/2012 | Conde Marques | G06F 21/6218 713/193 |
| 2013/0125107 A1* | 5/2013 | Bandakka | H04L 67/10 717/171 |
| 2014/0089653 A1* | 3/2014 | Jang | G06F 11/1417 713/2 |
| 2021/0064386 A1* | 3/2021 | Bak | G06F 3/0644 |

* cited by examiner

INFORMATION PROCESSING APPARATUS AND CONTROL METHOD OF THE SAME

BACKGROUND OF THE INVENTION

Field of the Invention

The present invention relates to an information processing apparatus and a control method of the same.

Description of the Related Art

In recent years, an information processing apparatus, including an image forming apparatus, with built-in firmware has been at increasing risk of being subject to firmware tampering attack by an attacker. In addition, an abnormal condition of a storage device storing firmware such as a nonvolatile memory due to aging degradation or the like may cause a change in storage contents. For this reason, a recent known image forming apparatus has a function of verifying the validity of firmware on start-up and prohibiting the operation of the image forming apparatus when the firmware is determined to be invalid. For example, Japanese Patent Laid-Open No. 2019-153050 proposes a start-up control apparatus that performs control to stop the start-up of an information processing apparatus when first individual information acquired by an acquisition unit on start-up of the information processing apparatus is not registered in a storage unit.

Such an image forming apparatus cannot be used until the firmware is restored to a normal state by repair or the like. However, it is a loss for a user to have downtime during which the image forming apparatus cannot be used regardless of whether or not the cause is tampering of the firmware. Therefore, in order to shorten the downtime of the apparatus and reduce a disadvantage for the user, a known image forming apparatus has an automatic restoration function for restoring and recovering the firmware in which an abnormality is detected.

However, the conventional technology described above has a problem described below. Normally, in an information processing apparatus such as an image forming apparatus, verification of a Master Boot Record (MBR) or a GUID Partition Table (GPT) that is management information of data stored in a storage device is first performed on start-up. Specifically, after a BIOS is started by a CPU upon start-up of an apparatus, partition information is acquired from a GPT stored in a storage device such as an SSD or an eMMC, and verification of each program is performed. Here, for example, when the BIOS detects tampering or damage of the GPT that is management information, repairing is performed using a GPT for a restoration purpose stored in the last sector of the storage device.

Meanwhile, the size of a storage device such as an eMMC may differ depending on the manufacturer. In this case, since it is costly to create firmware images to be stored in storage devices into different sizes corresponding to each storage device size, a firmware image may be created in a small size in advance so that the firmware image can be commonly used in storage devices of different sizes. In addition, a partition configuration may change due to software update or the like, and thereby the size of a firmware image may be increased or decreased.

However, when a firmware image of a specific size is stored in storage devices of different sizes as described above, there is a possibility that the last sector of the firmware image and the last sector of a storage device do not match each other. Consequently, in restoring the GPT by the BIOS, the GPT for a restoration purpose, which is originally supposed to be present in the last sector of the storage device, is missing, and thus the GPT cannot be restored to a normal state.

SUMMARY OF THE INVENTION

The present invention enables realization of a system in which, when an abnormality is detected in management information of data stored in a storage device, a storage location of management information for a restoration purpose stored in advance in the storage device is identified and the management information is restored.

One aspect of the present invention provides an information processing apparatus comprising: a nonvolatile storage unit configured to store at least first management information including information regarding number of sectors in a storage area, second management information including information regarding a partition, and third management information for restoring the second management information; a verification unit configured to verify validity of the second management information on start-up of the information processing apparatuses; and a restoration unit configured to identify, in a case where an abnormality is detected in the second management information by the verification unit, a storage location of the third management information based on the first management information, and restore the second management information in which the abnormality is detected using the third management information.

Another aspect of the present invention provides a control method of an information processing apparatus comprising a nonvolatile storage unit configured to store at least first management information including information regarding number of sectors in a storage area, second management information including information regarding a partition, and third management information for restoring the second management information, the method comprising: verifying validity of the second management information on start-up of the information processing apparatuses; and identifying, in a case where an abnormality is detected in the second management information in the verifying, a storage location of the third management information based on the first management information, and restoring the second management information in which the abnormality is detected using the third management information.

Further features of the present invention will be apparent from the following description of exemplary embodiments with reference to the attached drawings.

DESCRIPTION OF THE EMBODIMENTS

Figure 1:
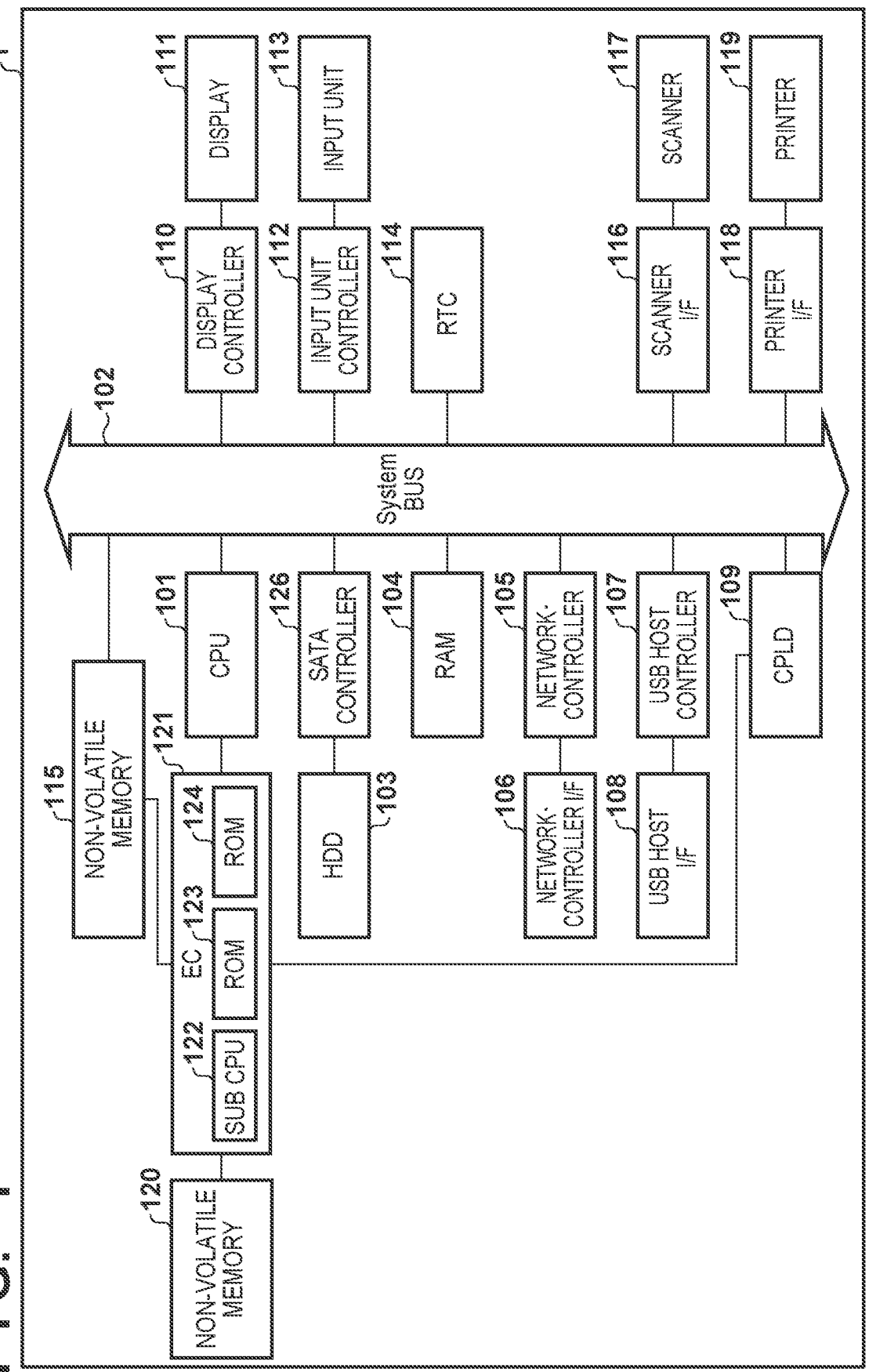
FIG. 1 is a block diagram for explaining a hardware configuration of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Information Processing Apparatus

Embodiments of the present invention will be described below. First, a hardware configuration of an image forming apparatus 1 as an example of an information processing apparatus according to the present embodiment will be described with reference to FIG. 1.

The image forming apparatus 1 includes a CPU 101, an HDD 103, a SATA controller 126, a RAM 104, a network controller 105, a network controller I/F 106, a USB host controller 107, and a USB host I/F 108. Further, the image forming apparatus 1 includes a CPLD 109, an EC 121, a nonvolatile memory 115 and 120, a display controller 110, a display 111, an input unit controller 112, an input unit 113, and an RTC 114. Furthermore, the image forming apparatus 1 includes a scanner I/F 116, a scanner 117, a printer I/F 118, and a printer 119. Each of these devices can mutually transmit and receive data by a system bus 102.

The CPU 101 is a central arithmetic processing unit that operates software for operating the image forming apparatus 1. The system bus 102 is a path through which the CPU 101 accesses other units and a path through which other units access each other. The Hard Disk Drive (HDD) 103 stores software of the image forming apparatus 1, various programs, databases, and temporary storage files necessary for the image forming apparatus 1 to operate. The Random Access Memory (RAM) 104 is a storage area in which programs of the image forming apparatus 1 are deployed and variables during program operation and data transferred from each unit by a Dynamic Memory Access (DMA) are stored.

The network controller 105 and the network controller I/F 106 perform communication between the image forming apparatus 1 and other equipment on the network. The USB host controller 107 and the USB host I/F 108 control communication between the image forming apparatus 1 and a USB device. The USB host I/F 108 is connected to the USB device using a USB cable. Depending on a configuration of a USB device, the USB host I/F is directly connected to the USB device without using a USB cable.

The display 111 displays an operation status of the image forming apparatus 1 so that a user or the like can check the operation status. The display controller 110 performs display control on the display 111. The input unit 113 receives an instruction from a user to the image forming apparatus 1. In addition, the input unit controller 112 controls the input unit 113. Specifically, the input unit 113 is implemented by an input device such as a keyboard, a mouse, a numeric keypad, a cursor keypad, a touch panel, an operation unit keyboard, and the like. In a case where the input unit 113 is a touch panel, implementation is such that the input unit 113 is physically attached to the surface of the display 111.

The real time clock (hereinafter, RTC) 114 has a clock function, an alarm function, a timer function, and the like of the image forming apparatus 1. The nonvolatile memory 115 is a rewritable memory. The CPLD 109 is a unit that reads a Low/High status of a signal line on a board circuit via the CPU 101 or enables the CPU 101 to change a setting of the Low/High status. The CPLD 109 is a programmable logic device, and is a unit that enables OFF/ON control of a power system on the image forming apparatus 1. A General Purpose Input Output (hereinafter referred to as GPIO) is present inside the CPLD 109. The CPU 101 enables the OFF/ON control of the power system by changing a set value of the GPIO register. The scanner 117 is connected to the image forming apparatus 1 via the system bus 102 and the scanner I/F 116. In addition, the printer 119 is connected to the image forming apparatus 1 via the system bus 102 and the printer I/F 118.

The Embedded Controller (EC) 121 verifies the validity of a BIOS program in the nonvolatile memory 115. The EC 121 includes a sub-CPU 122, a sub-ROM 123, and a sub-RAM 124. When the EC 121 is energized, the sub-CPU 122 executes a program in the sub-ROM 123, and thereby the sub-CPU 122 reads out ECFW on the nonvolatile memory 115 and deploys the ECFW in the sub-RAM 124. The sub-CPU 122 uses a program developed on the sub-RAM 124 to verify whether or not the nonvolatile memory 115 is tampered. The EC 121 is also connected to the non-rewritable nonvolatile memory 120 for a backup purpose, and when the nonvolatile memory 115 is determined to be in an invalid state, the EC 121 overwrite the nonvolatile memory 115 with the content of the nonvolatile memory 120.

Internal Configuration of HDD

Figure 2:
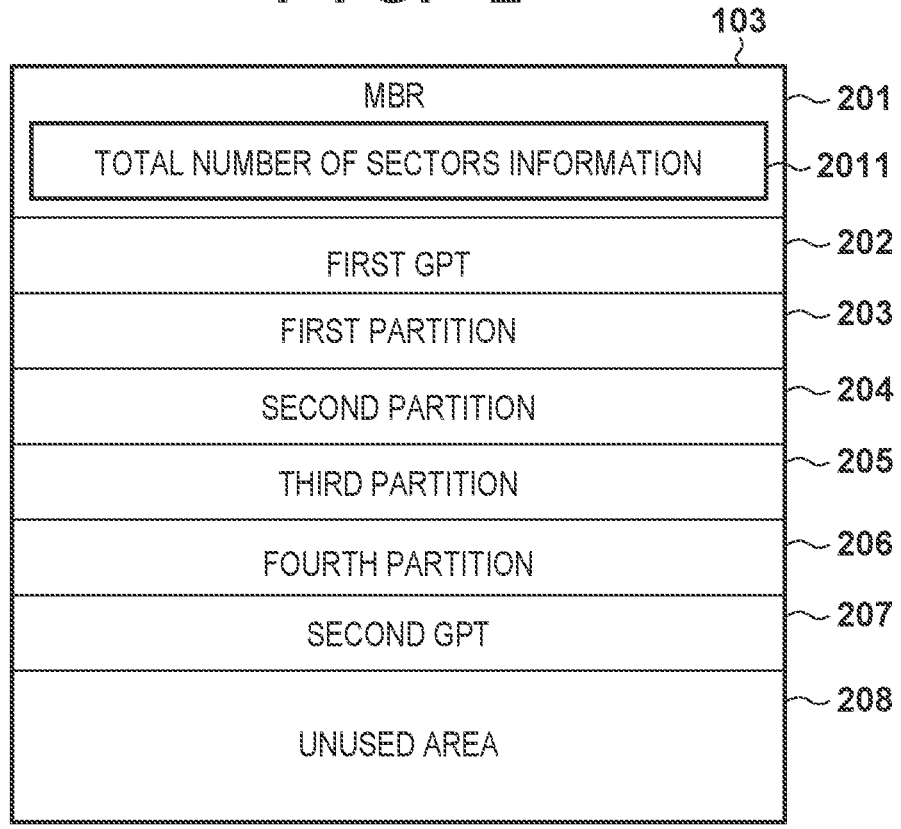
FIG. 2 is a block diagram illustrating an internal configuration of an HDD 103 according to an embodiment.

Next, the internal configuration of the HDD 103 according to the present embodiment will be described with reference to FIG. 2. In the present embodiment, an HDD will be described as an example of a nonvolatile memory, but this is not intended to limit the present invention, and other storage devices such as an embedded MultiMediaCard (eMMC) and a solid state drive (SSD) may be used. Note that the top part of the drawing corresponds to the head area on the address in the HDD. Also, an example in which Logical Block Addressing (LBA) is used as location information will be described. The LBA is a method which includes dividing a storage device such as an HDD into sectors each having a unit size and identifying a location by an index number of the sector from the head of the storage device, and the LBA is also a unit of the location information. In a case where the unit of LBA is 512 KB, for example, LBA 0 is pointing from the head of the storage device to the 511th byte, and LBA 100 is pointing from 51200th byte to 51711th byte.

A Master Boot Record (MBR) 201, which is first management information, is present at the head of the HDD 103. The MBR 201 is the head sector that is present outside a partition and includes a total number of sectors information 2011 of the LBA used. A first GUID Partition Table (GPT) area 202 includes second management information regarding each partition to be described later. For example, the first GPT area 202 stores the location information of a first partition 203 on the HDD 103, and GUID information indicating a use of the first partition.

The HDD 103 includes a plurality of partitions. Each partition 203 to 206 is storing data with a different use. For example, the first partition 203 is holding a Loader or a Kernel necessary for start-up processing. Four partitions are illustrated in the example of FIG. 2, but the number of partitions may be any number other than four.

A second GPT area 207 that stores third management information is a backup area for the first GPT area 202 that stores the second management information. The information included in the second GPT area 207 is substantially identical to the information included in the first GPT area 202, but differs in that the information included in the second GPT area 207 includes self-location information and backup location information. When an abnormality is detected in the second management information due to damage or tampering of the first GPT area 202, the first GPT area 202 is restored using the third management information of the second GPT area 207. After the first GPT area 202 is overwritten with the content of the second GPT area 207, a modification is made so as to ensure consistency of the location information described above. The last area, which is a trailing region posterior to the last sector of the HDD 103, is an unused area 208. In the image forming apparatus 1, the unused area 208 is not used. Of course, every area may be used instead of providing an unused area. By providing the unused area 208 in this manner, the present invention can be applied regardless of the memory size of the HDD 103. On the other hand, the second GPT area 207 is not provided in the last area (trailing region), and the location of the second GPT area 207 varies depending on the memory size. Therefore, according to the present embodiment, the location of the second GPT area 207 is identified using the total number of sectors information 2011.

Start-Up Processing

Figure 3:
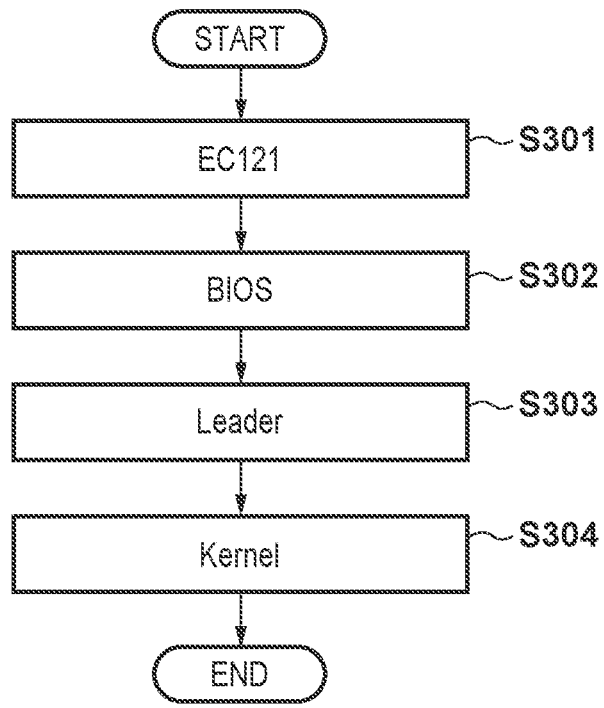
FIG. 3 is a flowchart illustrating an overview of start-up processing according to an embodiment.

Next, a procedure for start-up processing of the image forming apparatus 1 according to the present embodiment will be described with reference to FIG. 3. As will be described below, the image forming apparatus 1 according to the present embodiment sequentially verifies the validity of each program on start-up, and starts executing each of the program when no abnormality is detected.

First, in S301, when it is detected that a power switch is turned on, the EC 121 reads out software for the EC 121 that is reset-released and stored in the nonvolatile memory 115 to start operation. The EC 121 verifies the validity of the BIOS stored in the nonvolatile memory 115, reset-releases the CPU 101 when no abnormality is detected, and starts BIOS processing.

Subsequently, in S302, the CPU 101 executes the BIOS processing. The CPU 101 verifies the validity of the Loader stored in the HDD 103, and performs initialization processing of each hardware. When no abnormality is detected in the Loader, the CPU 101 deploys the Loader from the HDD 103 into the RAM 104, and starts Loader processing in S303.

Next, in S304, the CPU 101 verifies the validity of the Kernel stored in the HDD 103, loads the Kernel into the RAM 104 when no abnormality is detected, and starts Kernel processing. Subsequently, the CPU 101 verifies the validity of each firmware included in the HDD 103, and sequentially start up the firmware when no abnormality is detected.

GPT Restoration Processing

Figure 4:
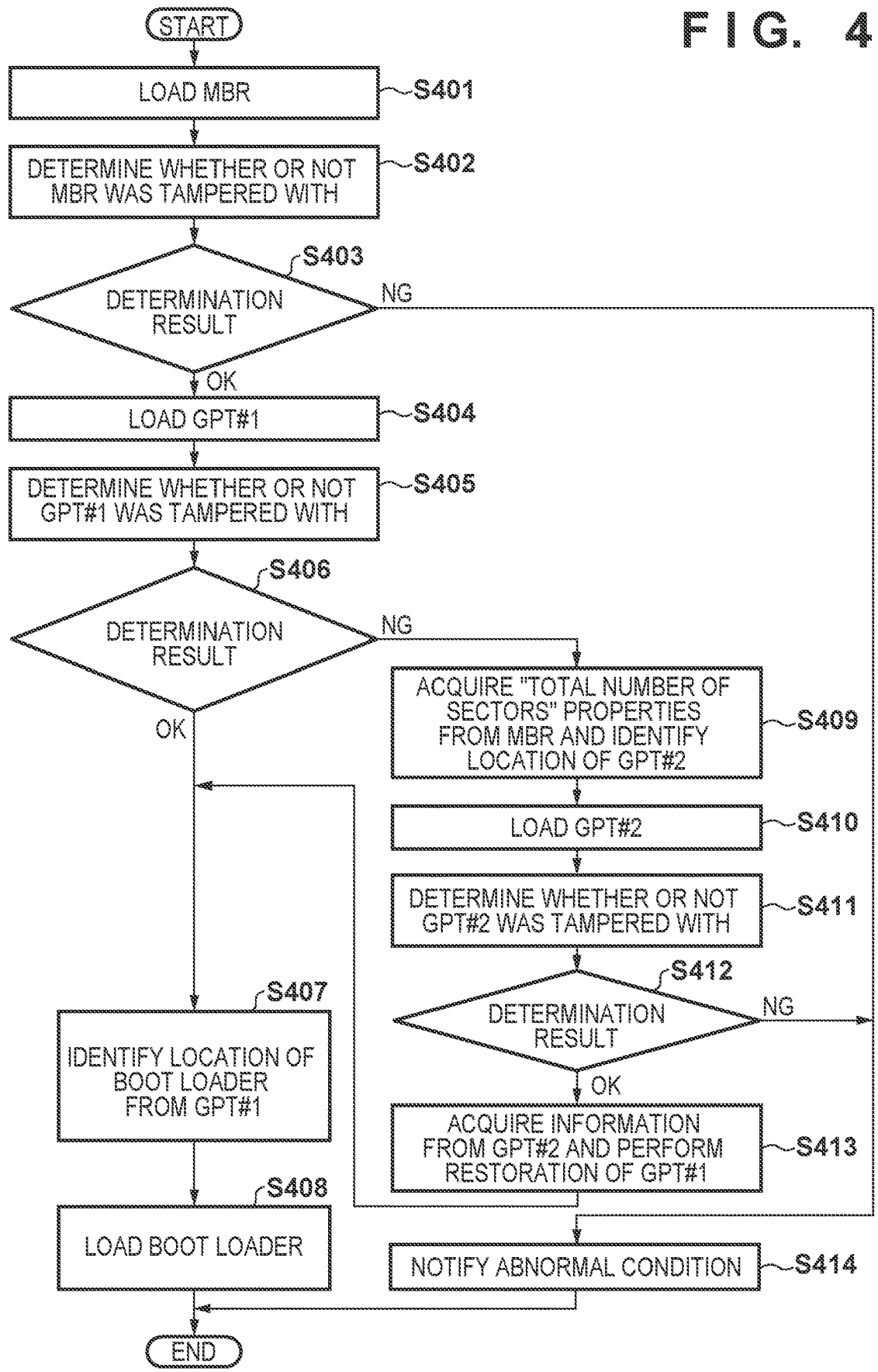
FIG. 4 is a flowchart illustrating an overview of GPT restoration processing according to an embodiment.

Next, a procedure for GPT restoration processing of the image forming apparatus 1 according to the present embodiment will be described with reference to FIG. 4. The processing described below corresponds to part of the processing in S302 and is executed by the CPU 101.

In S401, the CPU 101 loads the MBR 201 from the HDD 103. Upon completion of loading, the CPU 101 verifies whether or not the MBR 201 is valid in S402. A determination method may be a signature verification method or a simple method such as checking a signature area included in the MBR. For example, in the case of checking the signature area, it is possible to determine whether or not the MBR is valid depending on whether or not the last two bytes of the MBR area are 0xAA55.

Next, in S403, the CPU 101 advances the processing to S404 when the MBR 201 is determined to be valid by the verification processing in S402, or to S414 when the MBR 201 is determined to be invalid, that is, an abnormality is detected in the MBR 201. In S404, the CPU 101 loads the first GPT area 202 from the HDD 103. Upon completion of loading, the CPU 101 verifies whether or not the second management information included in the first GPT area 202 is valid in S405. Regarding the verification processing, for example, signature verification processing using a public key is performed on electronic signature information attached to data.

In S406, the CPU 101 advances the processing to S407 when the second management information included in the first GPT area 202 is determined to be valid by the verification processing in S405, or to S409 when the second management information is determined to be invalid. In S407, the CPU 101 identifies a partition in which Loader is stored from the first GPT area 202. For example, in the Unified Extensible Firmware Interface (UEFI) specification, it is defined that a GUID is stored in a predefined path of a partition of an EFI System Partition (ESP). Therefore, the storage location of the Loader can be identified based on a GUID and a path of a partition entry in the first GPT area 202. Subsequently, in S408, the CPU 101 loads the Loader identified in S407, and thereafter, the Loader takes over the start-up processing of the image forming apparatus, and terminates the processing of the flowchart.

On the other hand, in S409, that is, when the first GPT area 202 is determined to be invalid in S406, the CPU 101 acquires the total number of sectors information 2011 in use from the MBR 201. The second GPT area 207 is located in the last sector of the LBAs in use, and the sector number thereof is a numerical value identical to the total number of sectors information 2011. Subsequently, in S410, the CPU 101 loads the third management information stored in the second GPT area 207 identified in S409.

Upon completion of loading, the CPU 101 verifies whether or not the third management information included in the second GPT area 207 is valid, in S411. Next, in S412, the CPU 101 advances the processing to S413 when the third management information of the second GPT area 207 is determined to be valid by the verification processing, or to S414 when the third management information is determined to be invalid. In S413, the CPU 101 executes the restoration processing for restoring the second management information of the first GPT area 202, which is determined to be invalid, by using the third management information of the second GPT area 207, and advances the processing to S407. In the restoration processing, processing of overwriting the content of the first GPT area 202 with the content of the second GPT area 207 is executed.

On the other hand, in S414, that is, when the MBR 201, the first GPT area 202, and the second GPT area 207 are determined to be invalid, the CPU 101 makes an error notification of a start-up failure, does not execute subsequent start-up processing, and stops the start-up of the image forming apparatus.

As described above, the information processing apparatus according to the present embodiment includes a nonvolatile storage unit that stores at least first management information including information regarding the number of sectors in a storage area, second management information including information regarding a partition, and third management information for restoring the second management information. The present information processing apparatus verifies the validity of the second management information on start-up. Further, when an abnormality is detected in the second management information, the present information processing apparatus identifies a location in which the third management information is stored based on the first management information, and restores the second management information in which the abnormality is detected using the third management information. Thus, according to the present invention, when an abnormality is detected in management information of data stored in a storage device, the storage location of management information for restoration stored in advance in the storage device can be accurately identified, and the management information with the abnormality can be restored. As described above, according to the present invention, even when the last sector of a firmware image and the last sector of a storage device do not match each other, it is possible to preferably identify the location of a GPT for restoration and restore a GPT in which an abnormality is detected. For example, even when a partition configuration is changed due to software update or the like, the number of partitions is increased or decreased, and the sector location of the second GPT is changed, it is possible to identify the location of the second GPT and perform restoration.

Note that the present invention is not limited to the embodiment described above, and various modifications can be made. For example, regarding the verification processing, a determination is made by performing signature verification processing using a public key on electronic signature information attached to respective data, but other methods may be used. Also, in the embodiment described above, an example in which verifications are performed by an identical method in S406 and S412 has been described, but different methods may be used, respectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD),) or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138253, filed Aug. 26, 2021, which is hereby incorporated by reference herein in its entirety.

What is claimed is:

1. An information processing apparatus comprising:
a nonvolatile storage unit configured to store at least first management information including information regarding a number of sectors in a storage area, second management information including information regarding a partition, and third management information for restoring the second management information;
a verification unit configured to verify validity of the second management information on start-up of the information processing apparatuses; and
a restoration unit configured to identify, in a case where an abnormality is detected in the second management information by the verification unit, a storage location of the third management information based on the first management information, and restore the second management information in which the abnormality is detected using the third management information,
wherein
the verification unit further verifies validity of the first management information on start-up of the information processing apparatus,
the restoration unit, in a case where an abnormality is detected in the first management information by the verification unit, makes a notification of the abnormality and stops the start-up of the information processing apparatus, prior to executing subsequent start-up processing, and
the restoration unit, in a case where no abnormality is detected in the first management information and an abnormality is detected in the second management information by the verification unit, restores the second management information using the third management information, prior to executing subsequent start-up processing,
wherein the restoration unit determines a total number of sectors from the information regarding number of sectors, and
wherein the third management information is restored by the restoration unit from a sector number having a numerical value identical to the determined total number of sectors.

2. The information processing apparatus according to claim 1, wherein the verification unit further verifies validity of the second management information restored by the restoration unit.

3. The information processing apparatus according to claim 1, wherein, in a case where no abnormality is detected in the second management information by the verification unit, a loader stored in the nonvolatile storage unit is loaded in accordance with the information regarding a partition in the second management information.

4. The information processing apparatus according to claim 1, wherein the nonvolatile storage unit includes an unused area in a trailing region posterior to the last sector.

5. The information processing apparatus according to claim 1, wherein
the first management information is a Master Boot Record (MBR), and
the second management information is a GUID Partition Table (GPT).

6. The information processing apparatus according to claim 1, wherein the nonvolatile storage unit is a Hard Disk drive (HDD), an embedded MultiMediaCard (eMMC), or a solid state drive (SSD).

7. A control method of an information processing apparatus comprising a nonvolatile storage unit configured to store at least first management information including information regarding a number of sectors in a storage area, second management information including information regarding a partition, and third management information for restoring the second management information, the method comprising:

verifying validity of the second management information on start-up of the information processing apparatuses; and identifying, in a case where an abnormality is detected in the second management information in the verifying, a storage location of the third management information based on the first management information, and restoring the second management information in which the abnormality is detected using the third management information, verifying validity of the first management information on start-up of the information processing apparatus, in a case where an abnormality is detected in the first management information by the verification unit, making a notification of the abnormality and stopping the start-up of the information processing apparatus, prior to executing subsequent start-up processing, and in a case where no abnormality is detected in the first management information and an abnormality is detected in the second management information by the verification unit, restoring the second management information using the third management information, prior to executing subsequent start-up processing, wherein the restoring includes determining a total number of sectors from the information regarding number of sectors, and wherein the third management information is restored by the restoration unit from a sector number having a numerical value identical to the determined total number of sectors.

\* \* \* \* \*